United States Patent [19]

Taylor

[11] Patent Number: 4,736,676

[45] Date of Patent: Apr. 12, 1988

[54] COMPOSITE PISTON

[75] Inventor: Allan H. Taylor, Newport News, Va.

[73] Assignee: The United States of America as represented by the Administrator of the National Aeronautics and Space Administration, Washington, D.C.

[21] Appl. No.: 890,683

[22] Filed: Jul. 30, 1986

[51] Int. Cl.[4] .................... F16J 1/04

[52] U.S. Cl. .................... 92/212; 92/176; 92/214; 92/222; 92/224; 123/193 P

[58] Field of Search .................... 92/212, 213, 214, 222, 92/223, 224, 248, 176; 123/193 P

[56] References Cited

U.S. PATENT DOCUMENTS

| | | | |
|---|---|---|---|
| 1,373,263 | 3/1921 | Regenbogen | 92/176 |
| 1,969,470 | 8/1934 | McCoy | 92/224 |
| 2,473,254 | 6/1949 | Morris | 92/213 |
| 3,152,523 | 10/1964 | Whitfield et al. | 92/224 X |
| 3,882,841 | 5/1975 | Silverstein | 92/176 X |
| 4,202,310 | 5/1980 | Zorrilla et al. . | |
| 4,242,948 | 1/1981 | Stang et al. . | |
| 4,245,611 | 1/1981 | Mitchell et al. . | |
| 4,306,489 | 12/1981 | Driver et al. . | |
| 4,404,935 | 9/1983 | Kraft . | |
| 4,440,069 | 4/1984 | Holtzberg et al. . | |
| 4,450,610 | 5/1984 | Schaper . | |
| 4,506,593 | 3/1985 | Sugiyama et al. . | |
| 4,512,699 | 4/1985 | Jackson et al. . | |

FOREIGN PATENT DOCUMENTS

| | | |
|---|---|---|
| 2129523 | 5/1984 | United Kingdom . |

*Primary Examiner*—Edward K. Look
*Attorney, Agent, or Firm*—George F. Helfrich; John R. Manning

[57] ABSTRACT

A composite piston structure is disclosed which provides a simple and reliable means for joining a carbon-carbon or ceramic piston cap 11 with a metallic piston body 13. Attachment is achieved by means of a special geometry which compensates for differences in thermal expansion without complicated mechanical fastening devices. The shape employs a flange created by opposed frustoconical shapes 12 and 19 with coincident vertices 15 intersecting on the radial centerline of the piston in order to retain the piston cap. The use of carbon-carbon for the piston cap material allows a close fit between the piston and a cylinder wall, eliminating the need for piston rings. The elimination of extra mechanical parts of previous composite pistons provides a lightweight composite piston capable of extended high temperature operation.

13 Claims, 4 Drawing Sheets

COMPOSITE PISTON

ORIGIN OF THE INVENTION

The invention described herein was made by an employee of the U.S. Government and may be manufactured and used by or for the Government for governmental purposes without the payment of any royalties thereon or therefor.

TECHNICAL FIELD OF THE INVENTION

The invention relates to insulated pistons for internal combustion engines, and more particularly, to composite pistons designed to operate at high temperatures with increased engine efficiency and durability.

BACKGROUND OF THE INVENTION

Various composite piston designs have been proposed for use in internal combustion engines, particularly diesel engines, for a variety of reasons. Among these reasons are to allow higher operating temperatures, increase efficiency and minimize pollutants. Another important reason for the development of a durable composite piston, not discussed in the prior art, is for application in military vehicles. In military service internal combustion engines may be subjected to severe operating conditions. It is necessary to maximize the time an engine may operate with complete coolant loss in order to increase the survivability of the vehicle.

In order to achieve these objectives, prior art composite pistons have relied upon cumbersome flexible mechanical attachment of the piston cap to the metal body, or have provided strain isolation pads between the nonmetallic piston cap and the metal body. These attachment complexities have been required to compensate for the dissimilar coefficients of thermal expansion of the metallic piston body and various piston cap materials.

The former method of attachment usually employs some type of spring device to accommodate thermal expansion and contraction between the fastener and parts fastened. The springs are subject to fatigue wear which increases at high temperatures. When the springs become fatigued they fail to tightly retain the piston cap leading to vibration, noise, dynamic loading and subsequent failure.

The use of strain isolation pads to alleviate thermal expansion differences has inherent problems similar to those associated with the previous method. A typical configuration is made by casting the metallic piston body around the piston cap, which is shaped such that it is retained by the metal around it. Strain isolation pads are placed in the areas where the cap and body interface in order to absorb expansion and prevent thermal stress. In such a design the strain isolation pads are subject to fatigue and crushing, and loss of their resiliency, allows the piston cap to loosen and vibrate.

Also, a number of existing composite piston designs have a metal bolt through the cap, or have a portion of the metal body which extends to the top surface of the cap to provide a means for retaining the piston cap. These designs create a heat short to the metal piston body and significantly limit the maximum operating temperature of the piston.

In addition to extra parts for the purpose of retaining the piston cap, composite pistons have traditionally required piston rings to seal the gap between the piston and cylinder bore. The requirement of piston rings significantly increases the cost of piston manufacture while also increasing the weight of the piston, hence reducing the efficiency.

It is therefore an object of the present invention to provide a composite piston structure with the piston cap attached to the piston body in such a manner as to alleviate thermal stresses.

It is a further object of the present invention to alleviate thermal stress, which would otherwise develop due to different expansion rates for the piston cap and body, without the use of complicated or unreliable mechanical fasteners or strain isolation pads.

A further object of the present invention is to significantly increase the maximum operating temperature of an engine.

A further object of the present invention is to increase the thermal efficiency of an engine.

Another object of the present invention is to decrease the level of pollutants in engine exhaust.

Another object of the present invention is to eliminate the necessity of piston rings in an internal combustion engine utilizing composite pistons.

BRIEF SUMMARY OF THE INVENTION

According to the present invention, the foregoing and additional objects are attained by providing a piston cap of material with good high temperature properties, shaped such that a metallic piston body can be cast around the bottom of the piston cap. The preferred material for the piston cap is carbon-carbon because of its low thermal expansion rate and its higher strength and impact tolerance at elevated temperatures. The design of the composite piston is such that differences in thermal expansion between the piston cap and metallic piston body are compensated for by the geometry of the piston cap. The cap is retained through the use of opposed frustoconical shapes with coincident vertices which form a flange shaped base that does not restrain thermal expansion. The theoretical intersection point of the vertices must occur within the boundaries of the piston cap. Thermal stresses are eliminated without the use of ineffective or unreliable mechanical fastening means. The piston cap must be sized larger in diameter than the piston body in order to accommodate radial expansion of the metallic piston body. Because of its excellent properties at high temperature, a carbon-carbon piston cap may be lapped to closely fit the cylinder bore and thus eliminate the need for piston rings.

DETAILED DESCRIPTION OF THE INVENTION

Figure 1:
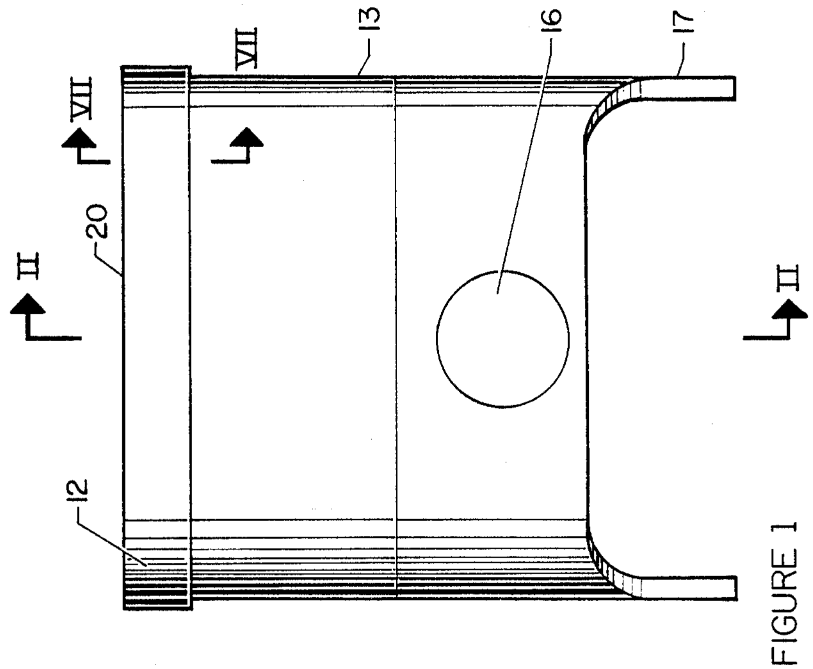
FIG. 1 is a side view of the new composite piston.
Figure 2:
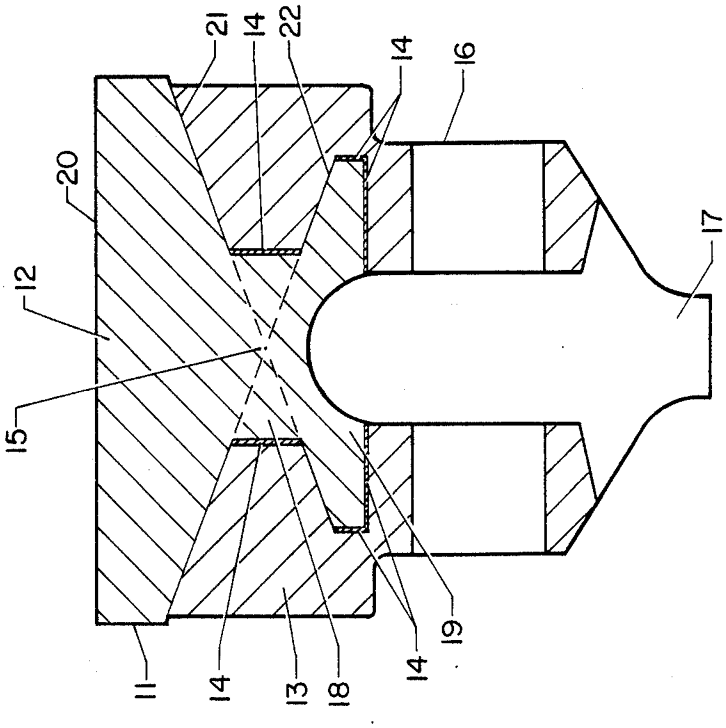
FIG. 2 is a sectional view of FIG. 1 taken along line II—II.

Referring to FIGS. 1 and 2, the composite piston of the present invention generally comprises a piston cap 11 and a metallic piston body 13. A metallic material is the preferred piston body material for most applications, however, non-metallic materials such as graphite polyimide, graphite epoxy or Torlon® poly(amide-imide) would be suitable for some applications. The piston cap 11, for descriptive purposes only, may be considered to consist of three portions: the shank 18 which connects two frustoconical portions, the crown 12, and the base 19. The composite piston is formed by casting the metallic piston body 13 around the piston cap as shown in FIG. 2. The unique geometry of the piston cap 11 prevents the creation of thermal stresses due to differences in expansion rates for the cap 11 and body 13. The piston cap 11 is shaped such that conical faces with coincident vertices 15 are formed by the crown bottom surface 21 and the base upper surface 22. The point of coincidence of the theoretical vertices of the cones must reside within the boundaries of the piston cap 11; however, the preferred location is on the radial centerline of the composite piston, as shown in FIG. 2. When the composite piston is heated in service or cooled during the fabrication process the metal piston body 13 expands or contracts radially from the point of coincident vertices. Where the metal piston body 13 contacts the piston cap 11, on the base upper surface 22 and the crown bottom surface 21, the snug fitting conical surfaces slide without interference. Since the metallic piston body 13 is free to expand or contract, no thermal stress is produced in the piston body 13 or the piston cap 11. In order to accommodate the expansion of the piston body 13 the outside diameter of the crown 12 must be slightly larger than the outside diameter of the metallic piston body 13.

The new composite piston is provided with a wrist pin hole 16 and a piston skirt 17 known in the art in order to allow the new piston to be readily adapted to existing engines.

Figure 9:
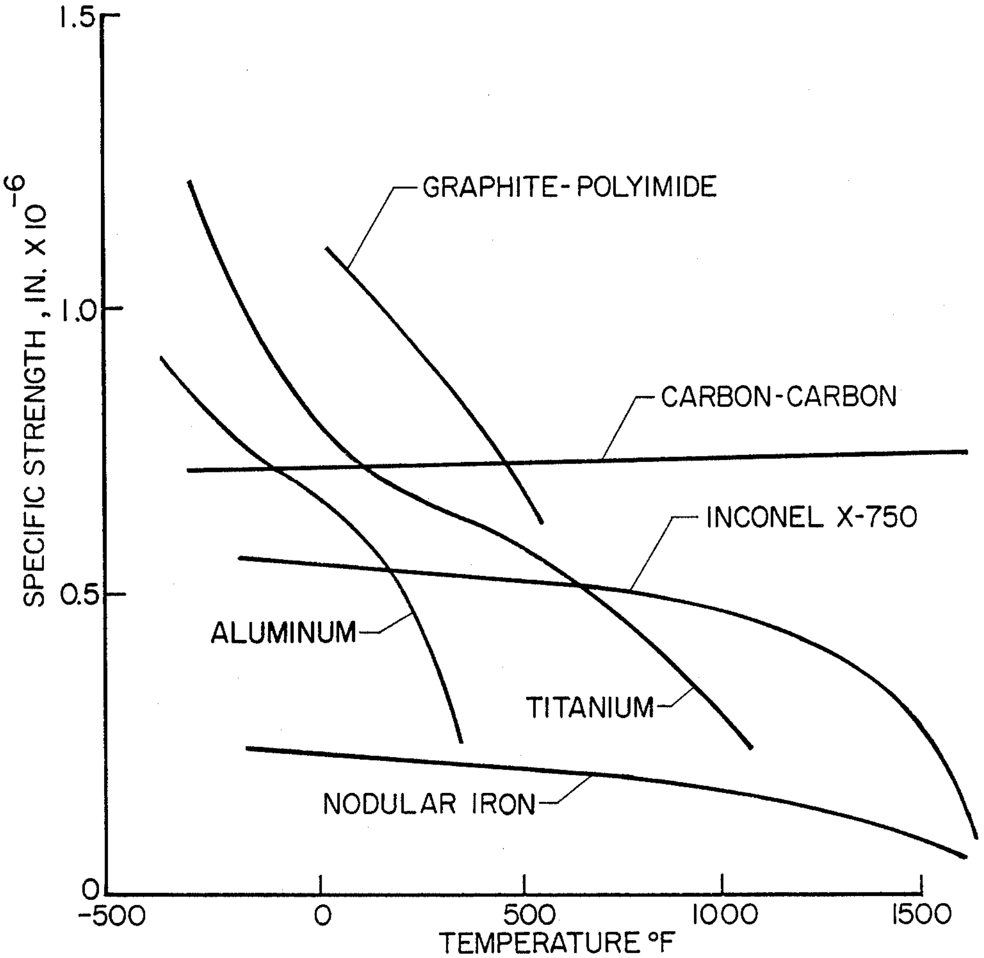
FIG. 9 is a specific strength versus temperature graph comparing carbon-carbon, aluminum and other potential piston materials.

The piston cap 11 may be manufactured from any material which exhibits suitable properties at high temperatures. Typical materials would be ceramics such as silicon carbide, alumina, compglass, etc. In the preferred embodiment the piston cap is made with carbon-carbon. The term carbon-carbon as employed herein refers to a carbon fiber-carbon matrix structure. The use of carbon-carbon allows small piston cap to cylinder wall clearances, in the range of 0.0001 inch to 0.001 inch depending on the cylinder size. This small piston cap to cylinder clearance eliminates the necessity of piston rings and ring lands. Factors contributing to this small clearance include the negligible coefficient of thermal expansion of carbon-carbon, $0.3\times10^{-6}$ in/in/deg F, which is over forty times smaller than aluminum and twenty-five times smaller than steel. Also important is the fact that carbon-carbon uniquely maintains its strength at elevated temperatures as shown in FIG. 9.

The carbon-carbon material is made from carbon fibers which are pyrolyzed from a precursor fiber such as rayon or polyacrylonitrile (PAN). The fibers are then impregnated with a carbonaceous resin system based on furfuryl alcohol or phenolic resin and repyrolyzed several times to increase the strength and density of the material while subsequently reducing the porosity. In general, the PAN precursor is stretched about eighty percent either prior to or during stabilization, a cycle which involves heating the fiber at 220° C. for twenty-four hours in air. Carbonization, the next phase, consists of slowly heating the fiber in an inert atmosphere to 1000° C. The fibers are then graphitized by raising the temperature to the desired heat treatment temperature, usually in the range of 1000° C. to 2500° C.

Figure 6:
FIG. 6 is a view of random or mat fiber orientation.
Figure 7:
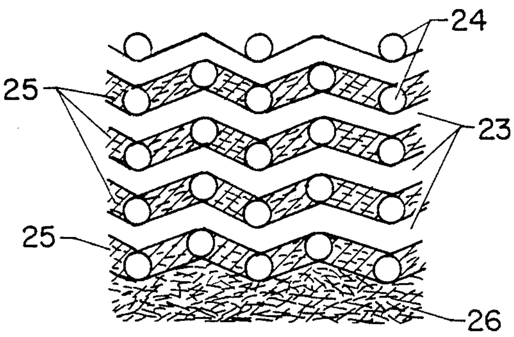
FIG. 7 is a sectional view of FIG. 1 showing fiber orientation in the piston crown along line VII—VII.

The carbon-carbon piston cap 11 is formed to approximately net shape in a closed die using primarily a precursor fiber in a mat or random fiber (roving) orientation, as shown in FIG. 6, with selective reinforcements consisting of unidirectional fibers or cloth, see FIG. 7, at the more highly loaded areas like the crown upper surface 20 and the sliding surfaces 21 and 22. The unidirectional fiber or cloth is layered in a 0°, ±45°, 90° orientation to provide quasi-isotropic mechanical properties which are significantly higher than the random fiber/mat construction. The ultimate tensile strength, for example, is 35 ksi for the unidirectional fiber compared to only eight ksi for the random fiber. After the final pyrolysis cycle, the piston cap is machined into final shape using conventional machining operations.

Ceramic felt pads 14, or other suitable crushable spacers, are bonded to the vertical and horizontal faces of the shank 18 and base 19 as shown in FIG. 2. The piston cap 11 with the crushable spacers 14 is then placed in another die and the metallic piston body 13 is cast around the piston cap. The crushable spacers prevent the molten metal from contacting the shank 18 and base 19 surfaces where thermal stress could be generated. The final fit of the piston cap 11 to the cylinder bore is achieved by lapping or grinding the piston cap 11 to precisely fit the cylinder bore.

Details of the piston cap 11 fabrication include cloth layers comprising the upper crown surface 12, the crown bottom surface 21, and the base upper surface 22.

As an example, FIG. 7 shows the fiber orientation along a cross-section of the crown 12. The carbon cloth is represented by a warp fiber 23 and fill fibers 24. The voids in the cloth layers are filled with the matrix material 25. Carbon mat 26 lies under the cloth layers. The carbon-carbon mat consists of random carbon fiber roving in a carbon matrix.

Figure 8:
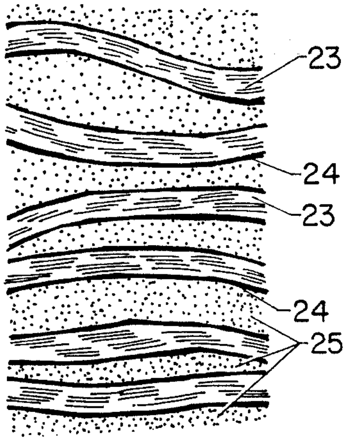
FIG. 8 is a magnification (50×) of woven cloth fibers.
Figure 5:
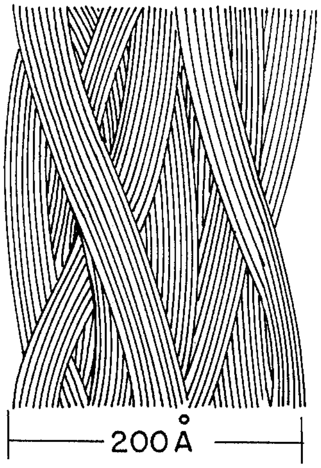
FIG. 5 is a view of an axial or unidirectional fiber orientation.

FIG. 8 represents an enlargement of the woven cloth fibers. The Figure is magnified fifty times, with the actual length of a side of the Figure being 0.07 inch. Curved warp fibers 23, straight fill fibers 24, and the matrix 25 are all depicted.

Figure 3:
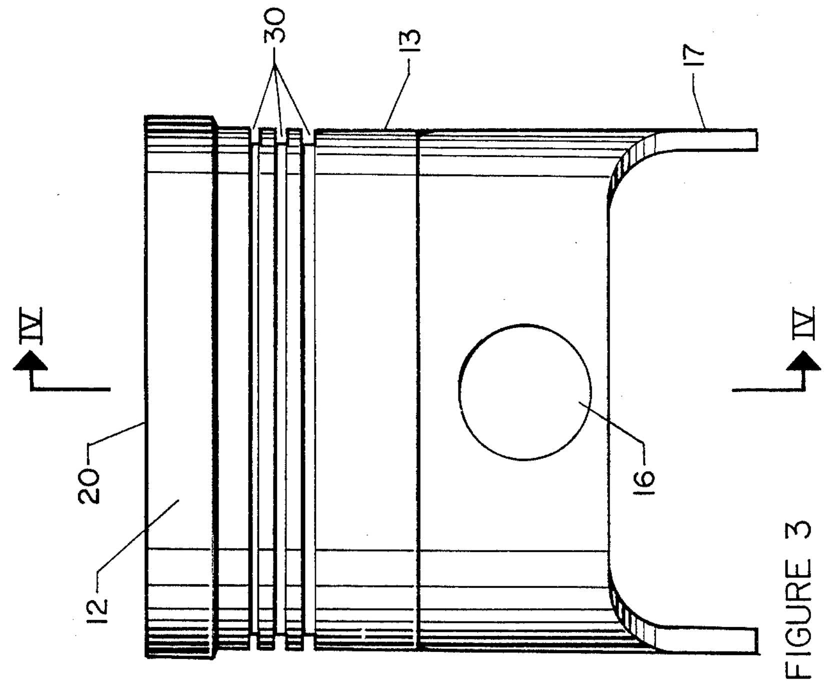
FIG. 3 is a side view of the new composite piston with added ring lands.
Figure 4:
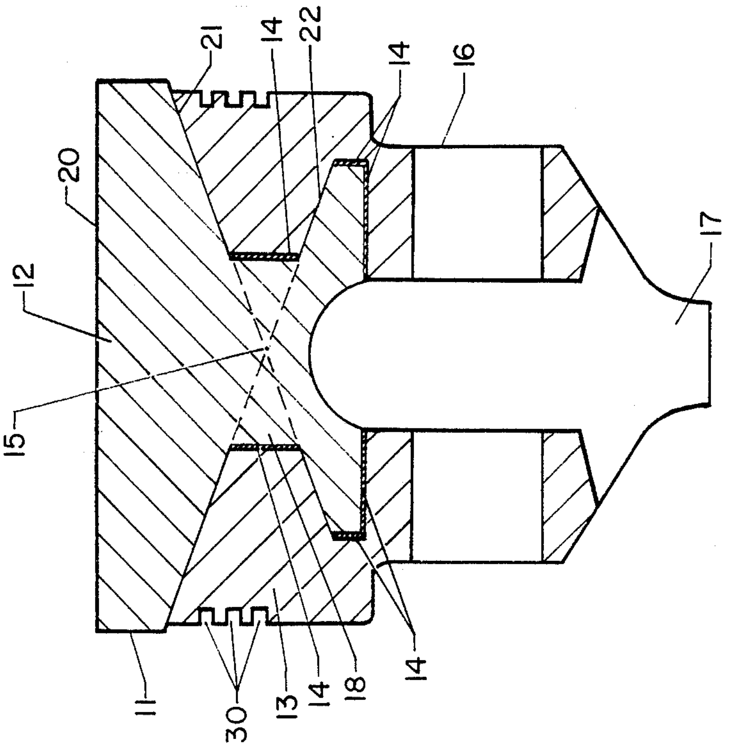
FIG. 4 is a sectional view of FIG. 3 taken along line IV—IV.

An alternative embodiment of the invention comprehends the addition of piston ring lands 30 as shown in FIGS. 3 and 4. The addition of piston ring lands 30 to the metal piston body 13 permits the use of piston rings in order to provide additional containment of combustion gases.

In addition to being built into a new engine, the composite piston can be adapted to fit into existing engines. The structure of this invention allows the composite piston to operate at higher temperatures than a traditional piston. Limiting factors are the maximum use temperature of the cap material and the thickness of the piston cap to prevent heat transfer to the metallic piston body. This invention is also an advance over the prior composite pistons because of the simple mechanical means of retaining the piston cap without imparting any thermal stresses.

The simplicity of the retention structure and the low density of carbon-carbon makes possible a lighter piston than previously possible with an all metal or composite construction. The following Table compares the various properties of carbon-carbon, aluminum and Inconel X-750:

TABLE 1

| | Aluminum | Carbon-Carbon | Inconel X-750 |
|---|---|---|---|
| Modulus of Elasticity, E. psi | 10,000,000 | 12,000,000 | 30,000,000 |
| Ultimate Tensile Strength, psi @ 300° F. | 25,000 | 24,000 | 150,000 |
| Yield Strength, psi | 11,000 | 24,000 | 110,000 |
| Emissivity | .02 | 0.8 | 0.1 |
| Thermal Conductivity Btu/hr-ft-°F. | 80.0 | 4.0 | 8.0 |
| Specific Heat, C Btu/lb-°F. | 0.23 | 0.3 | 0.12 |
| Density, lb/in$^3$ | 0.100 | 0.067 | 0.289 |
| Coefficient of Thermal Expansion in/in/°F. | $12.5 \times 10^{-6}$ | $0.3 \times 10^{-6}$ | $7.0 \times 10^{-6}$ |
| Melting Point °F. | 1100 | 4200* | 2600 |

*Sublimes

The possibility of blowby causing piston erosion, or oxidation caused by temperatures above 800° F., can be avoided by applying an impervious high temperature oxidation resistant coating developed for carbon-carbon, such as silicon carbide. The oxidation resistant coating is provided on the exterior surfaces of the cap 11 by converting several layers of carbon fiber to silicon carbide. An alternate approach would be to add oxidation inhibitors such as boron to the basic material during the impregnation cycles.

The efficiency and durability of an internal combustion engine is greatly increased through the use of the carbon-carbon composite piston. Efficiency is increased due to the higher allowable operating temperature and lower piston weight. Durability increases because the piston is able to withstand a higher maximum temperature before failure, and there are no springs or other mechanical parts which may fail. Also the cost of composite pistons is reduced by the simplicity of the design and low part count compared to prior art concepts.

Although specific embodiments of the invention have been described herein, they are to be considered as exemplary of the novel features thereof and are not exhaustive. There are obviously many variations and modifications of these specific examples that will be readily apparent to those skilled in the art in light of the above teachings without departing from the spirit or scope of the appended claims. It is, therefore, to be understood that the invention may be practiced otherwise than as specifically described.

What is claimed as new and desired to be secured by Letters Patent of the U.S. is:

1. A composite piston for operation at high temperatures comprising:
   a piston body;
   a piston cap of material resistant to high temperatures supported and retained by the piston body;
   the piston cap having a crown portion, a vertical shank and a base, said crown portion having top and bottom surfaces, and being larger in diameter than the piston body;
   said vertical shank having vertical faces within the crown circumference and extending downwardly from the bottom face of the crown;
   said base having horizontal and vertical faces being connected to the crown by means of the vertical shank;
   the upper surface of the base and bottom surface of the crown being formed by a single pair of opposed frustoconical shapes with coincident vertices intersecting within the boundaries of the piston cap.

2. A composite piston for operation at high temperatures comprising:
   a piston body;
   a piston cap of material resistant to high temperatures supported and retained by the piston body;
   the piston cap having a crown portion, a vertical shank and a base, said crown portion having top and bottom surfaces, and being larger in diameter than the piston body;
   said vertical shank having vertical faces within the crown circumference and extending downwardly from the bottom face of the crown;
   said base having horizontal and vertical faces being connected to the crown by means of the vertical shank;
   the upper surface of the base and bottom surface of the crown being formed by a single pair of opposed frustoconical shapes with coincident vertices intersecting on the radial centerline of the piston body.

3. A composite piston for operation at high temperatures comprising:
   a piston body;
   a piston cap of material resistant to high temperatures supported and retained by the piston body;
   the piston cap having a crown portion, a vertical shank and a base, said crown portion having top and bottom surfaces, and being larger in diameter than the piston body;
   said vertical shank having vertical faces within the crown circumference and extending downwardly from the bottom face of the crown;
   said base having horizontal and vertical faces being connected to the crown by means of the vertical shank;
   crushable spacers affixed to the vertical and horizontal faces of the base and vertical shank;
   the upper surface of the base and bottom surface of the crown being formed by a single pair of opposed frustoconical shapes with coincident vertices intersecting within the boundaries of the piston cap.

4. A composite piston for operation at high temperatures comprising:
   a piston body;
   a piston cap composed of carbon-carbon and retained by the piston body;
   the piston cap having a crown portion, a vertical shank and a base, said crown portion having top and bottom surfaces, and being larger in diameter than the piston body;
   said vertical shank having vertical faces within the crown circumference and extending downwardly from the bottom face of the crown;
   said base having horizontal and vertical faces being connected to the crown by means of the vertical shank;
   the upper surface of the base and bottom surface of the crown being formed by a single pair of opposed frustoconical shapes with coincident vertices intersecting within the boundaries of the piston cap.

5. A piston cap according to claim 4 wherein the piston cap is sized so as to have a crown-to-cylinder wall clearance of from 0.0001 inch to 0.001 inch.

6. A piston cap according to claim 4 wherein the carbon-carbon piston cap has structural ingredients of:

precursor fiber; and a carbonaceous resin.

7. A piston cap according to claim 6 wherein the precursor fiber is rayon.

8. A piston cap according to claim 6 wherein the precursor fiber is polyacrylonitrile.

9. A piston cap according to claim 6 wherein the carbonaceous resin is based on furfuryl alcohol.

10. A piston cap according to claim 6 wherein the carbonaceous resin is a phenolic resin.

11. A carbon-carbon piston cap according to claim 4 wherein the top surface of the crown is reinforced with unidirectional fibers or cloth layered in a 0°, ±45°, 90° orientation.

12. A carbon-carbon piston cap as in claim 4 which has a coating of a high temperature oxidation resistant material for avoiding piston cap erosion and oxidation.

13. A carbon-carbon piston cap as in claim 4 which is impregnated with a high temperature oxidation resistant material for avoiding piston cap erosion and oxidation.

* * * * *